United States Patent
Alabi et al.

(10) Patent No.: US 12,548,365 B2
(45) Date of Patent: Feb. 10, 2026

(54) DETECTING OBJECT BURN-IN ON DOCUMENTS IN A DOCUMENT MANAGEMENT SYSTEM

(71) Applicant: DocuSign, Inc., San Francisco, CA (US)

(72) Inventors: Taiwo Raphael Alabi, Berkeley, CA (US); Ashwath Saran Mohan, San Ramon, CA (US); Nipun Dureja, Seattle, WA (US); Jerome Levadoux, San Mateo, CA (US)

(73) Assignee: Docusign, Inc., San Francisco, CA (US)

( * ) Notice: Subject to any disclaimer, the term of this patent is extended or adjusted under 35 U.S.C. 154(b) by 383 days.

(21) Appl. No.: 17/992,434

(22) Filed: Nov. 22, 2022

(65) Prior Publication Data

US 2024/0169755 A1    May 23, 2024

(51) Int. Cl.
*G06V 30/418* (2022.01)
*G06V 30/148* (2022.01)
*G06V 30/19* (2022.01)

(52) U.S. Cl.
CPC .......... *G06V 30/418* (2022.01); *G06V 30/153* (2022.01); *G06V 30/19093* (2022.01)

(58) Field of Classification Search
CPC .............................................. G06V 30/00–43
See application file for complete search history.

(56) References Cited

U.S. PATENT DOCUMENTS

| | | | |
|---|---|---|---|
| 9,634,875 B2 | 4/2017 | Porat | |
| 10,430,570 B2 | 10/2019 | Gonser | |
| 2002/0029232 A1* | 3/2002 | Bobrow | G06V 30/418 514/534 |
| 2014/0280254 A1* | 9/2014 | Feichtner | G06F 18/40 707/755 |
| 2015/0150090 A1 | 5/2015 | Carroll | |
| 2017/0053164 A1* | 2/2017 | Eagleton | G06V 10/225 |
| 2017/0357852 A1* | 12/2017 | Cai | G06V 30/416 |
| 2019/0026550 A1* | 1/2019 | Yang | G06N 3/045 |
| 2020/0372217 A1* | 11/2020 | Abuammar | G06F 40/56 |
| 2022/0035993 A1* | 2/2022 | Bhandarkar | G06F 40/169 |

(Continued)

FOREIGN PATENT DOCUMENTS

| | | | | |
|---|---|---|---|---|
| CN | 112632952 A | * | 4/2021 | ............. G06V 10/22 |
| CN | 114896979 A | * | 8/2022 | ............. G06N 3/045 |

OTHER PUBLICATIONS

Anonymous, "Index of /courses/cse573/12sp/lectures," (Jan. 1, 2012), Retrieved on Feb. 7, 2024; Retrieved from URL: https://courses.cs.washington.edu/courses/cse573/12sp/lectures/.

(Continued)

*Primary Examiner* — Sean T Motsinger
(74) *Attorney, Agent, or Firm* — KDW FIRM PLLC

(57) ABSTRACT

A document management system surfaces changes to a portable document format (PDF) document to a user. The document management system converts each page of the PDF document into images, segments those images, and processes each segment of those images using computer vision and/or natural language processing. The document management system compares segments from an original copy of the PDF document with segments from a modified copy of the PDF document to identify significant changes to the PDF document.

20 Claims, 7 Drawing Sheets

(56) References Cited

U.S. PATENT DOCUMENTS

| | | | |
|---|---|---|---|
| 2022/0108556 A1* | 4/2022 | Peng .................... | G06F 40/103 |
| 2023/0027526 A1* | 1/2023 | Kim ...................... | G06F 40/30 |
| 2023/0162521 A1* | 5/2023 | Gao .................... | G06V 30/153 |
| | | | 382/181 |
| 2024/0028651 A1* | 1/2024 | Coquard ............. | G06V 30/248 |
| 2024/0169755 A1* | 5/2024 | Alabi .................. | G06F 40/279 |

OTHER PUBLICATIONS

International Search Report and the Written Opinion of the International Searching Authority for International Application No. PCT/US2023/080303, mailed Feb. 23, 2024, 33 pages.

Mausam, "Document Similarity in Information Retrieval," Based on slides of W. Arms, Thomas Hofmann, Ata Kaban, Melanie Martin, (May 2, 2012), Retrieved on Feb. 7, 2024; Retrieved from URL: https://courses.cs.washington.edu/courses/cse573/12sp/lectures/17-ir.pdf.

* cited by examiner

Application for Employment — 300

Personal Information
Name
Email
Phone No.:

Education
High School
College

I attest that all information provided here is accurate to the best of my knowledge _____    _____
Date                Signature

Application for Employment — 330

Personal Information
Name    Jane Doe
Email    jane.doe@yahoo.com
Phone No.:   (123) 456-7890

Education
High School    Acme High School
College    Acme College of the Arts I attest that all information provided here is accurate to the best of my knowledge October 1, 2022    *Jane Doe*
Date                Signature

Application for Employment

Personal Information
Name  Jane Doe
Email  jane.doe@yahoo.com
Phone No.:  (123) 456-7890

Education
High School  Acme High School
College  Acme College of the Arts

I attest that all information provided here is accurate to the best of my knowledge October 1, 2022
Date

*Jane Doe*
Signature

FIG. 4A

Application for Employment

Personal Information
Name   Jane Doe
Email   jane.doe@yahoo.com
Phone No.:   (123) 456-7890

Education
High School   Acme High School
College   Acme College of the Arts

I attest that all information provided here is accurate to the best of my knowledge

*Jane Doe*
Signature

October 1, 2022
Date

FIG. 4B

DETECTING OBJECT BURN-IN ON DOCUMENTS IN A DOCUMENT MANAGEMENT SYSTEM

TECHNICAL FIELD

The disclosure generally relates to the field of document management, and specifically to detecting object burn-in on documents in a document management system.

BACKGROUND

Online document management systems can be used to create and review documents, providing users with tools to edit, view, and execute the documents. When a user edits a document, other users may not readily notice the modifications to the document. Manually reviewing changes to documents can be time and labor intensive, especially when handling a number of documents. Accordingly, there is a need to improve document review processes in document management systems.

SUMMARY

A document management system surfaces changes in secure electronic documents. The document management system receives an original copy of a Portable Document Format (PDF) document, as well as a modified copy of the PDF document. The document management system rasterizes both the original copy and the modified copy of the PDF document into a plurality of images, where each image represents a page of the PDF document. The document management system segments each of the plurality of images into a plurality of segments. For corresponding segments derived from the original copy and the modified copy of the PDF document, the document management system generates a representation of text in each corresponding segment. The document management system also determines similarity characteristics between each corresponding segment. The document management system determines, based on the similarity characteristics, whether the PDF document has been changed. In response to determining that the PDF document has been changed, the document management system surfaces one or more changes between the original copy and the modified copy of the PDF document to a user.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 3A illustrates an example original copy of a Portable Document Format (PDF) document, in accordance with an example embodiment.

FIG. 3B illustrates an example modified copy of the PDF document, in accordance with an example embodiment.

FIGS. 4A-B illustrate segments of an image of the modified copy of the PDF document, in accordance with an example embodiment.

DETAILED DESCRIPTION

Figure 1:
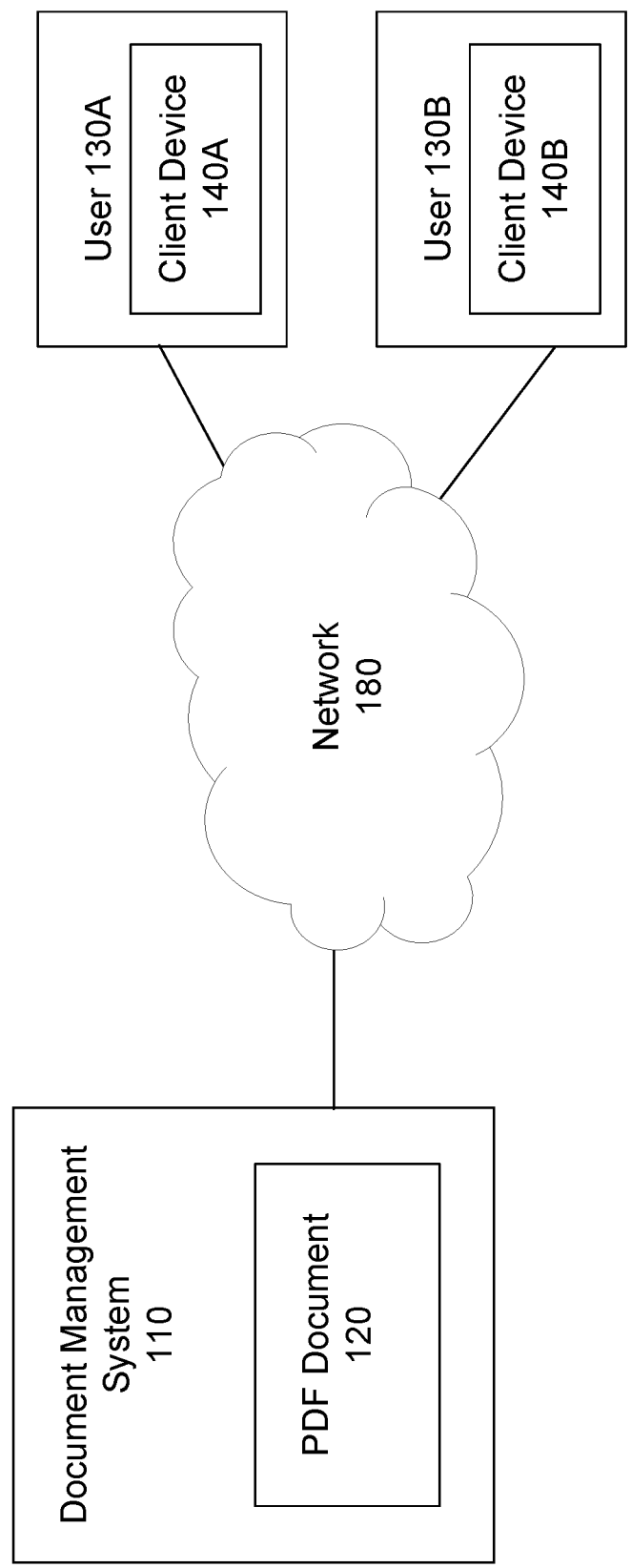
FIG. 1 is a high-level block diagram of a system environment for a document management system, in accordance with an example embodiment.

The Figures (FIGs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. A letter after a reference numeral, such as "120A," indicates that the text refers specifically to the element having that particular reference numeral. A reference numeral in the text without a following letter, such as "120," refers to any or all of the elements in the figures bearing that reference numeral.

The figures depict embodiments of the disclosed system (or method) for purposes of illustration only. One skilled in the art will readily recognize from the following description that alternative embodiments of the structures and methods illustrated herein may be employed without departing from the principles described herein.

Document Management System Overview

A document management system enables a party (e.g., individuals, organizations, etc.) to create and send documents to one or more receiving parties for negotiation, collaborative editing, electronic execution (e.g., via electronic signatures), contract fulfillment, archival, analysis, and more. For example, the document management system allows users of the party to create, edit, review, and negotiate document content with other users and other parties of the document management system. An example document management system is further described in U.S. Pat. No. 9,634,875, issued Apr. 25, 2017, and U.S. Pat. No. 10,430,570, issued Oct. 1, 2019, which are hereby incorporated by reference in their entirety.

The system environment described herein can be implemented within the document management system, a document execution system, or any type of digital transaction management platform. It should be noted that although description may be limited in certain contexts to a particular environment, this is for the purposes of simplicity only, and in practice the principles described herein can apply more broadly to the context of any digital transaction management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

A user of the document management system may create a document. The document includes one or more objects that comprise the content of the document, such as text, images, videos, signatures, and so on. The document originator (e.g., the user who created the document) may send the document to a recipient. The recipient may make changes to the document, by modifying, adding, and/or deleting objects within the document. For example, the recipient may alter the text of the document and/or add a signature. In another example, the recipient may delete frames of a video and/or modify an image embedded within the document. The recipient's changes are "burned-in" (e.g., rendered onto) the document.

In conventional document management systems, the document originator needs to manually review the document for objects that have been burned-in by the recipient. In some cases, the document originator may use word processing software to compare the recipient's modified copy of the document with the original copy of the document. However, these comparisons are often limited to text, and may not notify the document originator of changes to images, signatures, and other multimedia present in the document. As a result, the document review process may be time and labor intensive, subject to human error, and limited by conventional word processing techniques. Overlooking modifications to terms of an agreement or other legal documents, for example, may result in significant liability for the parties involved.

The methods described herein improve review processes within the document management system. Using image processing and machine learning, the document management system identifies text, as well as other objects, that have been burned into the PDF. The document management system compares an original copy of a document (e.g., the document created and transmitted by the document originator) with a modified copy of the document. The document management system accordingly identifies differences between the original and modified copies of the documents. The document management system identifies changes to the document with low latency, resulting in more efficient document review processes, as well as an improved user experience.

FIG. 1 is a high-level block diagram of a system environment 100 for a document management system 110, in accordance with an example embodiment. The system environment 100 enables users 130A-B to generate and review documents efficiently with the document management system 110. As illustrated in FIG. 1, the system environment 100 includes a document management system 110, users 130A-B and corresponding client devices 140A-B, each communicatively interconnected via a network 180. In some embodiments, the system environment 100 includes components other than those described herein. For clarity, although FIG. 1 depicts only two users 130A-B and two client devices 140A-B, embodiments of the system environment 100 can have any number of users and client devices. For the purposes of concision, the web servers, data centers, and other components associated with an online system environment are not shown in FIG. 1.

The document management system 110 is a computer system (or group of computer systems) for storing and managing documents for the users 130A-B. Using the document management system 110, the users 130A-B can create, edit, review, store, analyze, manage, and negotiate documents. For example, the users 130A-B may work on a Portable Document Format (PDF) document 120, which is stored, created, and reviewed in the document management system 110. The PDF document 120, as well as other documents in the document management system 110, may be employment agreements, purchase agreements, service agreements, financial agreements, master services agreements, intellectual property licensing agreements, rental agreements, mortgage agreements, and so on.

The document management system 110 can be a server, server group or cluster (including remote servers), or another suitable computing device or system of devices. In some implementations, the document management system 110 can communicate with the client devices 140A-B over the network 180 to receive instructions and send documents (or other information) for viewing on the client devices 140A-B. According to some embodiments, the user 130 is associated with permissions defining actions that the users 130A-B can take within the document management system 110, or on documents, templates, permissions associated with other users and/or workflows. The document management system 110 can assign varying permissions to individual users or groups of users controlling which documents each user can interact with and what level of control the user has over the documents they have access to. For example, the users 130A-B may have different permissions with respect to the PDF document 120. User 130A may be an originator of the PDF document 120 and have permission to send the PDF document 120 to a recipient, such as the user 130B. User 130B may have permission to edit the PDF document 120, but not to send the PDF document 130 to other users.

Using the client devices 140A-B, the users 130A-B can perform actions relating to documents stored within the document management system 110. Each client device 140A-B is a computing device capable of transmitting and/or receiving data over the network 180. Each client device 140A-B may be, for example, a smartphone with an operating system such as ANDROID® or APPLE® IOS®, a tablet computer, laptop computer, desktop computer, or any other type of network-enabled device from which secure documents may be accessed or otherwise interacted with. In some embodiments, the client devices 140A-B include an application through which the users 130A-B can access the document management system 110. The application may be a stand-alone application downloaded onto the client devices 140A-B from the document management system 110. Alternatively, the application may be accessed by way of a browser installed on the client devices 140A-B and instantiated from the document management system 110. The client devices 140A-B enable the users 130A-B to communicate with the document management system 110. For example, the client devices 140A-B enable the users 130A-B to upload, access, review, execute, and/or analyze documents within the document management system 110 via a user interface. In some implementations, the users 130A-B can also include AIs, bots, scripts, or other automated processes set up to interact with the document management system 110 in some way.

The network 180 transmits data within the system environment 100. The network 180 may be a local area or wide area network using wireless or wired communication systems, such as the Internet. In some embodiments, the network 180 transmits data over a single connection (e.g., a data component of a cellular signal, or Wi-Fi, among others), or over multiple connections. The network 180 may include encryption capabilities to ensure the security of customer data. For example, encryption technologies may include secure sockets layers (SSL), transport layer security (TLS), virtual private networks (VPNs), and Internet Protocol security (IPsec), among others.

Figure 2:
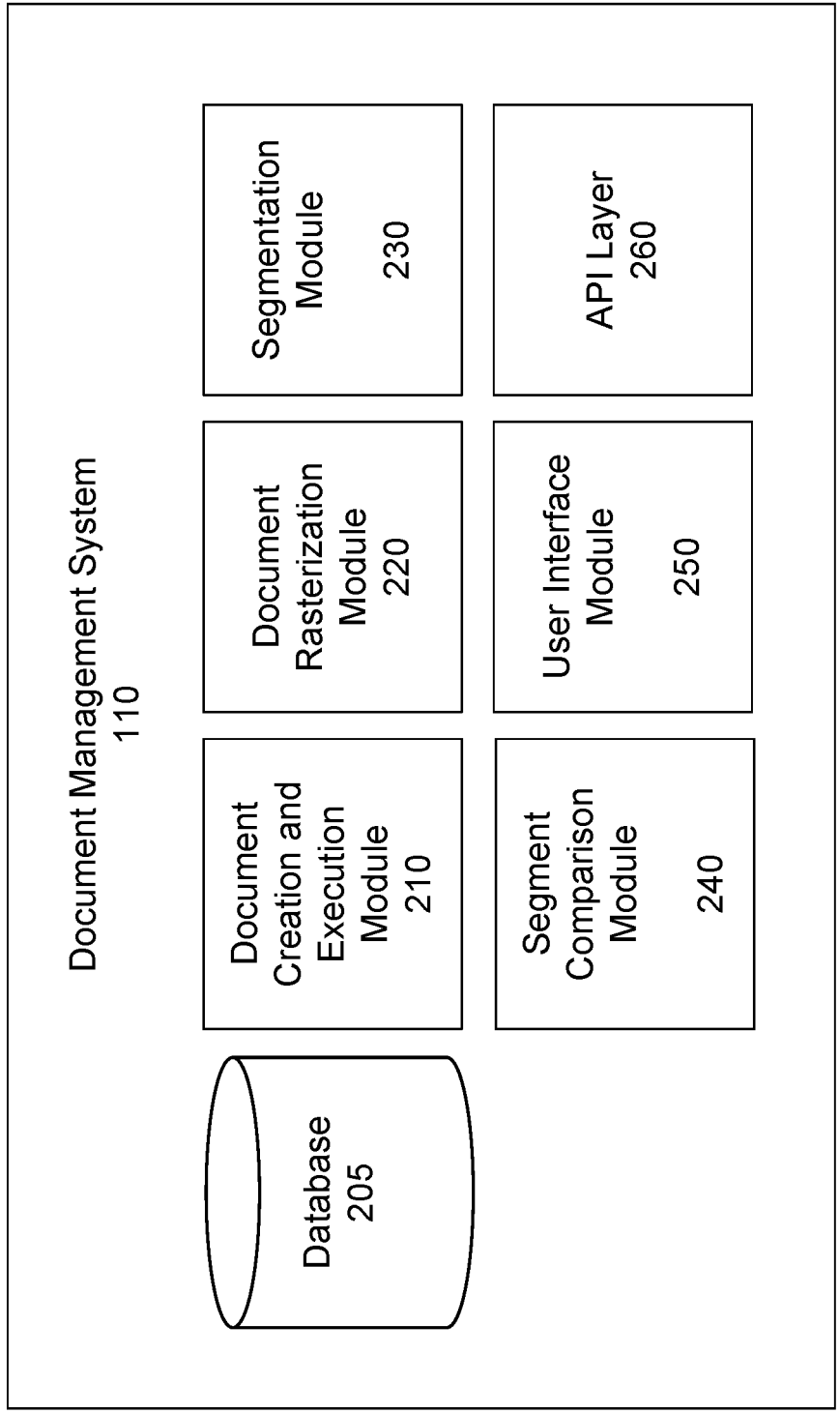
FIG. 2 is a high-level block diagram of a system architecture of the document management system, in accordance with an example embodiment.

FIG. 2 is a high-level block diagram of a system architecture of the document management system 110, in accordance with an example embodiment. The document management system 110 includes a database 205, a document creation and execution module 210, a document rasterization module 220, a segmentation module 230, a segment comparison module 240, a user interface module 250, and an application protocol interface (API) layer 260. Using these modules, the document management system 110 identifies significant revisions to the PDF document 120. Computer components such as web servers, network interfaces, security functions, load balancers, failover servers, management and network operations consoles, and the like may not be shown so as to not obscure the details of the system architecture. The document management system 110 may contain more, fewer, or different components than those shown in FIG. 2 and the functionality of the components as described herein may be distributed differently from the description herein. The functionality of the document management system 110 is generally described as acting on a server, separated from client devices 140A-B; however, this is merely for convenience. Functionality of the document management system 110 may be distributed in such a manner that any of its actions are partially or completely performed on the application installed on client device 140A.

The database 205 stores information relevant to the document management system 110. The database 205 can be implemented on a computing system local to the document management system 110, remote or cloud-based, or using any other suitable hardware or software implementation. The data stored by the database 205 may include, but is not limited to, the PDF document 120, text (including clauses, terms, and legal obligations, for example) of the PDF document 120, metadata associated with the PDF document 120, images of the PDF document 120, changes to the PDF document 120, information about users (e.g., the users 130A-B), client device identifiers (e.g., of the client devices 140A-B), machine-learned models, and other information stored by the document management system 110. The document management system 110 can update information stored in the database 205 as new information is received.

The document creation and execution module 210 allows users (e.g., the user 130A-B) to create, review, and execute documents, such as the PDF document 120. A document originator may create and provide the PDF document 120 to other recipients. In some embodiments, a recipient may have permission to edit the PDF document 120; the recipient may revise the text of and/or execute the PDF document 120. The document creation and execution module 210 saves a copy of the original PDF document 120 as finalized by the document originator ("the original copy"), as well as a copy of the PDF document 120 as modified by the recipient ("the modified copy"). The document creation and execution module 210 may store the original and modified copies of the PDF document 120 in the database 205.

The document rasterization module 220 rasterizes the original and modified copies of the PDF document 120 into one or more images. Rasterization converts the PDF document 120 into pixelated images that can be displayed on a screen (e.g., of the client devices 140A-B). The document rasterization module 220 rasterizes the PDF document 120 into a plurality of images, where each image corresponds to a page of the PDF document 120. The document rasterization module 220 also rasterizes each page of the modified copy of the PDF document 120.

The segmentation module 230 splits each rasterized image generated by the document rasterization module 220 into a plurality of segments. The segmentation module 230 performs the segmentation process for both the original and modified copies of the PDF document 120. Each segment includes a portion of content present in the corresponding page of the PDF document 120. For example, the segmentation module 230 may split an image of the first page of the PDF document 120 into three segments, resulting in each segment capturing a third of the content of the first page of the PDF document 120. The segmentation module 230 segments each image based on parameters defined by a user of the document management system 110. The user may specify height requirements for each segment and/or a number of segments per image. In other embodiments, the segmentation module 230 may segment each image such that text and/or other objects in the PDF document 120 remain intelligible (e.g., not sliced or distorted) in each segment. To capture all objects in the PDF document 120 during segmentation (e.g., so that objects are not lost between segments), the segmentation module 230 may generate overlapping segments. The segmentation module 230 may set a height for each segment as well as a buffer of pixels, by which to expand each segment. Each segment may therefore overlap in height with an adjacent segment as per the pixel buffer. For example, the segmentation module 230 may segment each image into four equal segments and set a pixel buffer of 20 pixels, such that each segment overlaps with an adjacent segment by 20 pixels.

In generating overlapping segments, the segmentation module 230 may capture a portion of the PDF document 120 twice. The segmentation module 230 identifies those overlapping segments and the repeated portion of the PDF document 120. The segmentation module 230 determines the overlapping segment within which the portion of the PDF document 120 would fit best. In response to determining that one of the segments contains a threshold amount of the repeated portion of the PDF document 120, for example, the segmentation module 230 may re-segment the image such that the portion of the PDF document 120 is wholly contained in that segment.

The overlapping segments may inadvertently slice content (e.g., an image, a signature, a sentence, a word), affecting the intelligibility of the content of each segment. Letters of words, for example, may be sliced horizontally. A first segment may include the top half of the letters, and a second segment may include the bottom half of the letters, such that the words are not discernible in either segment. In another example, the top third of a sentence may be in one segment, whereas the bottom two-thirds of the sentence may be in a second segment. The segmentation module 230 calculates a confidence score for each overlapping segment, the confidence score represents how confidently and/or accurately an optical character recognition (OCR) model is able to process the sliced content. The segmentation module 230 may calculate the confidence score using a natural language processing algorithm and/or other forms of machine learning. In response to the confidence score not meeting a minimum threshold, the segmentation module 230 re-segments the image such that the content is no longer sliced. To re-segment the image, the segmentation module 230 may expand the pixel buffer and/or increase the height of one or more segments. FIGS. 4A-B illustrate the output of the segmentation process in more detail.

By generating overlapping segments, the segmentation module 230 ensures that each segment contains discrete, intelligible portions of the PDF document 120. Each of these segments can be processed (e.g., by the segment comparison module 240, described below) independently, for example, via multiprocessing. Each segment may be processed on a different central processor, a different graphics processor, and/or a different cluster of computers. In this way, the document management system 110 efficiently identifies differences between the original copy of the PDF document 120 and the modified copy of the PDF document 120.

The segment comparison module 240 compares segments of the original copy with corresponding segments of the modified copy of the PDF document 120. For example, the segment comparison module 240 may compare a segment containing the first half of the first page of the original copy of the PDF document 120 with a segment containing the first half of the first page of the modified copy of the PDF document 120.

The segment comparison module 240 generates and compares representations of each segment. Where a segment contains text, the segment comparison module 240 performs optical character recognition (OCR) and generates a representation of the text (e.g., a text vector) based on the output of the OCR. In some embodiments, the segment comparison module 240 generates a text vector representing the text of the segment as a whole. In other embodiments, the segment comparison module 240 generates an average text vector for every sentence in the segment. The segment comparison module 240 may generate text representations other than text vectors. Segments may include content other than text, such as images, video, hyperlinks, and other multimedia. For example, a signature in the PDF document 120 may be captured within an image. In such cases, the segment comparison module 240 generates representations of each segment using pattern matching.

The segment comparison module 240 may use natural language processing and/or machine learning to generate segment representations. The segment comparison module 240 may use a machine-learned model to generate the segment representations. In some embodiments, the machine-learned model is configured to generate the segment representations based on features from each segment (e.g., colors, density of text, classes of objects, etc.). In other embodiments, the machine-learned model is a classifier that identifies the context of each segment and generates the segment representations accordingly. The machine-learned model may be trained using pre-existing documents in the document management system 110 (e.g., stored in the database 205). Other examples of machine learning techniques that may be used in various embodiments include linear support vector machines (linear SVM), boosting for other algorithms (e.g., AdaBoost), neural networks, logistic regression, naïve Bayes, memory based learning, random forests, bagged trees, decision trees, boosted trees, boosted stumps, and so on.

The segment comparison module 240 determines similarity characteristics between the representations of the corresponding segments. The segment comparison module 240 may use comparison metrics like cosine similarity, dot product, Manhattan distance, Euclidean distance, Chebyshev distance, or some combination thereof. In some embodiments, the segment comparison module 240 determines similarity characteristics between the average text vectors of corresponding segments. Similarly, the segment comparison module 240 may compare images, videos, and/or other multimedia between corresponding segments using image processing techniques.

In response to identifying an above threshold difference between the segment representations, the segment comparison module 240 determines that there is a significant difference between the two corresponding segments. The segment comparison module 240 may determine how significant a change is based on potential monetary risk, legal liability, and/or input from a user of the document management system 110. For example, the segment comparison module 240 may automatically flag any changes to monetary amounts in the PDF document 120 as significant. In another example, the segment comparison module 240 may automatically flag the addition of the word "not" to text in the PDF document 120 as significant.

Accordingly, the segment comparison module 240 identifies changes between the original and modified copies of the PDF document 120. The segment comparison module 240 may use techniques other than those described herein to determine whether changes between the original and modified copies of the PDF document 120 are significant. Users of the document management system 110 may be notified of these changes via the user interface module 250.

The user interface module 250 generates a user interface for users (e.g., the users 130A-B) to interact with the document management system 110. Through the generated user interface, the document management system 110 notifies users of differences between the original and modified copies of the PDF document 120. The user interface module 250 also allows users to create, upload, and/or revise the PDF document 120 (in addition to other documents), provide input on comparison metrics and threshold comparison values used by the segment comparison module 240, provide feedback on the changes identified by the segment comparison module 240, and so on. In addition, through the user interface, users can add, delete, or modify the contents of the PDF document 120, as well as other documents stored in the document management system 110.

API layer 260 orchestrates API calls between any applications of the client devices 140A-B and the document management system 110. For example, video editing applications, image generation or retrieval applications (e.g., a photos app of one's smartphone), location verification applications, and any other application installed on a client device may interact with the application of document management system 110 that is also installed on the client device and/or document management system 110 itself by way of an API. API layer 260 stores application protocol interfaces that are designed to normalize communications of each of the applications such that they are understood by document management system 110 and vice versa. Thus, if a user of client device 140A, for example, wishes to use a video application installed on the client device 140A to select a video to burn into a PDF document, API layer 260 selects an API to drive communications between the video application and an application of the document management system 110. API layer 260 may drive such inter-application communication across many applications simultaneously, enabling a user to burn all types of multimedia and/or metadata. As mentioned for all components of the document management system 110, API layer 260 may exist in part or entirely within client devices 140A-B, and may operate to orchestrate such behavior on-device rather than consulting a server.

The term PDF is used throughout because it is typical where a secure electronic document (e.g., a signature document) is captured in PDF format. However, wherever the term PDF is used, any other format that captures a secure electronic document may be used in place of a PDF in a manner consistent with the described PDF manipulation herein.

Example PDF Document

As described with respect to FIG. 2, the document management system 110 compares and identifies changes between an original copy and a modified copy of the PDF document 120. FIG. 3A illustrates an example original copy 300 of the PDF document 120 in accordance with an example embodiment. A user of the document management system 110 (e.g., the document originator) may create the PDF document 120 and send it to a recipient for revision and/or execution. The document management system 110 captures the original copy 300 of the PDF document 120 before the recipient makes any changes. The PDF document 120, shown to be an Application for Employment here, may include sections 310, 315, and 320 for the recipient to complete.

FIG. 3B illustrates an example modified copy 330 of the PDF document 120, in accordance with an example embodiment. The modified copy 330 of the PDF document 120 captures changes made by the recipient (e.g., the document signer). In this example, the recipient may complete the Application for Employment by including their personal information and education 340, the date 350, and their signature 360.

Example Segmentation of the PDF Document

To perform the comparison between the original and modified copies of the PDF document 120, the document management system 110 segments images of each page of the PDF document 120. FIGS. 4A-B illustrate segments of an image of the modified copy 330 of the PDF document 120, in accordance with an example embodiment. The image of the modified copy 330 is split into multiple segments 420, 430, and 440. The segments overlap: segment 420 overlaps with segment 430, which overlaps with segment 440. In FIG. 4A, segment 430 slices through content 450; in this example, the sliced content 450 corresponds to a phone number. The document management system 110 (e.g., the segmentation module 230) identifies the overlapping sections 420 and 430, as well as the content 450 present in the overlap, and determines which segment the content 450 fits best within. For example, the document management system 110 may apply an OCR model and/or another natural language processing algorithm to the content 450 to calculate a confidence score for each segment. In response to determining that the confidence score is higher for segment 430 (and/or in some embodiments, above a threshold amount for segment 430), the document management system 110 may re-segment the image such that the content 450 is present in segment 430. FIG. 4B illustrates an example result of re-segmentation, in which the content 450 is no longer sliced and is located within the segment 430. As mentioned in the foregoing, the activity of segment splitting, manipulation, and comparison may be performed in whole or in part on a client device 140A-B, rather than entirely on a server hosting document management system 110.

Example Changes to the PDF Document

Figure 5:
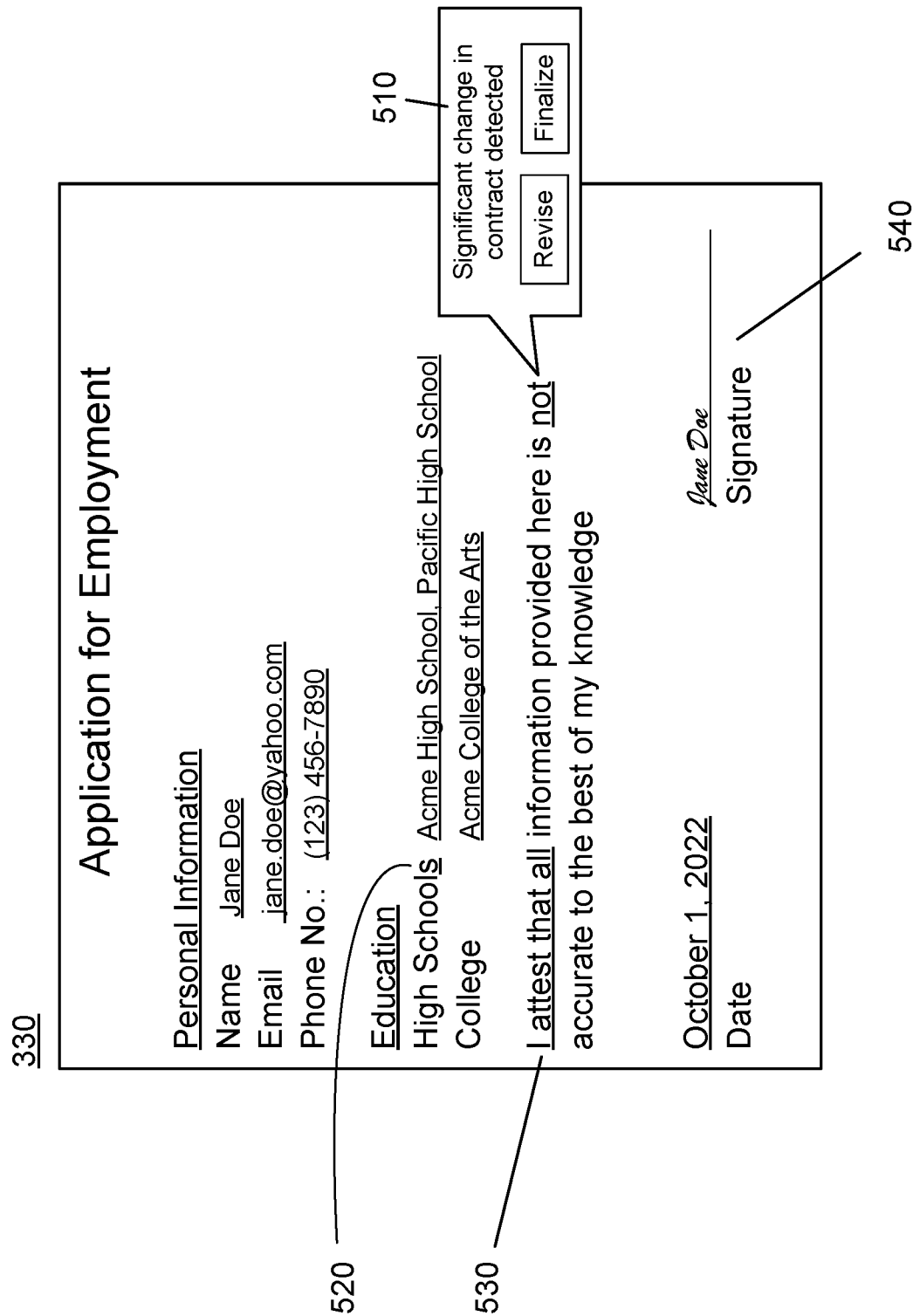
FIG. 5 illustrates changes between the original copy and the modified copy of the PDF document that are surfaced to a user, in accordance with an example embodiment.

FIG. 5 illustrates changes between the original copy 300 and the modified copy 330 of the PDF document 120 that are surfaced to a user, in accordance with an example embodiment. The document management system 110 (e.g., via the segment comparison module 240) compares similarity characteristics between segments of the original copy 300 with corresponding segments of the modified copy 330. The document management system 110 surfaces significant changes, such as those that significantly change the meaning of a phrase or clause, to the user. For example, in FIG. 5, the document management system 110 notifies 510 the user of the addition of the word "not" in the modified copy 330 of the PDF document 120. Insignificant changes 520 and 530, which show the addition of an "s" at the end of "High School" as well as a font change, respectively, may not be flagged to the user. The document management system 110 may not notify the user of anticipated changes 540, such as the addition of the date and the recipient's signature. In some embodiments, the user may opt to receive notifications for all changes, regardless of their significance, between the original copy 300 and the modified copy 330. The user may provide feedback (e.g., via the user interface module 250) on the significance of a surfaced change. In some embodiments, the document management system 110 may notify all users affiliated with the PDF document 120, including both the document originator and the signer. In other embodiments, the document management system 110 only notifies the originator of the PDF document 120.

EXAMPLE PROCESS

Figure 6:
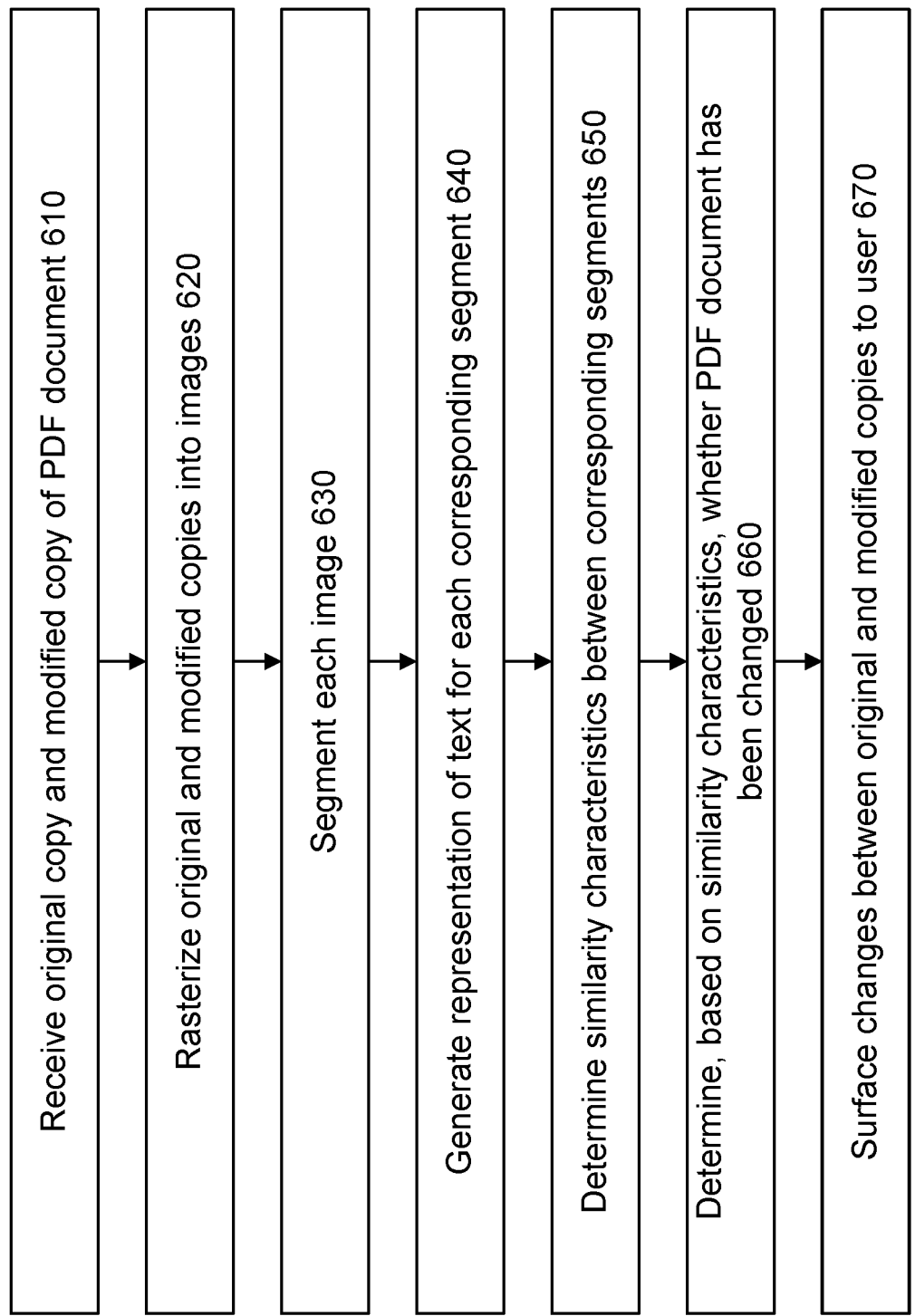
FIG. 6 illustrates an example process for surfacing changes in secure electronic documents, in accordance with an example embodiment.

FIG. 6 illustrates an example process for surfacing changes in secure electronic documents, in accordance with an example embodiment. The document management system (e.g., the document management system 110) receives 610 an original copy (e.g., the original copy 300) and a modified copy (e.g., the modified copy 330) of a portable document format (PDF) document (e.g., the PDF document 120).

The document management system rasterizes 620 both the original and modified copies into a plurality of images, where each image corresponds to a page of the PDF document.

The document management system segments 630 each of these images into a plurality of segments.

The document management system generates 640 a representation of text for corresponding segments derived from the original copy and the modified copy of the PDF document. Where a segment contains content other than text, such as an image based signature, the document management system generates a segment representation using pattern matching.

Comparing text representations of corresponding segments, the document management system determines 650 similarity characteristics between corresponding segments.

The document management system determines 660, based on the similarity characteristics, whether the PDF document has been changed.

The document management system surfaces 670 changes between the original copy and the modified copy of the PDF document to a user.

ADDITIONAL CONFIGURATION CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for surfacing changes in secure electronic documents comprising:
   receiving, using at least one processor, an original copy of a portable document format (PDF) document;
   receiving, using the at least one processor, a modified copy of the PDF document;
   rasterizing, using the at least one processor, both the original copy and the modified copy of the PDF document into a plurality of images, each image of the plurality of images representing a page, wherein at least one image in the plurality of images includes at least one burned-in object; and
   segmenting, using the at least one processor, each of the plurality of images into a plurality of segments, the segmenting includes
      determining a height and a buffer of a predetermined number of pixels for an image of each segment in the plurality of segments for expanding each segment;
      expanding two or more adjacent segments using the height and the buffer of predetermined number of pixels of each of the two or more adjacent segments to generate at least two overlapping segments that overlap by the predetermined number of pixels;
      determining at least one repeated portion in the original and modified copies of the PDF document in the at least two overlapping segments; and
      selecting a segment in the at least two overlapping segments in the original and modified copies of the PDF document representative of the at least one repeated portion;
   for corresponding selected segments derived from the original copy and the modified copy of the PDF document:
      generating, using the at least one processor, a representation of text in the corresponding selected segments;
      determining, using the at least one processor, similarity characteristics between the corresponding selected segments;
      determining, using the at least one processor, based on the similarity characteristics, whether the PDF document has been changed; and
      responsive to determining that the PDF document has been changed, generating, using the at least one processor, a graphical user interface including a graphical notification surfacing one or more changes between the original copy and the modified copy of the PDF document to a user, the graphical user interface including an indication of one or more significant changes altering a meaning of the selected segment.

2. The method of claim 1, further comprising receiving the original copy of the PDF document from a document originator.

3. The method of claim 1, further comprising receiving the modified copy of the PDF document from a signer.

4. The method of claim 1, wherein segmenting each of the plurality of images into the plurality of segments comprises:
   determining at least a portion of the PDF present in each overlapping segment;
   responsive to determining that a threshold amount of the portion of the PDF is in one of the overlapping segments, re-segmenting each of the plurality of images such that the portion of the PDF is present in a single segment.

5. The method of claim 1, wherein segmenting each of the plurality of images into the plurality of segments comprises:
   determining at least a portion of the PDF presenting in each overlapping segment;
   determining a confidence score for each overlapping segment, the confidence score corresponding to an optical character recognition (OCR) operation on the portion of the PDF present in each overlapping segment; and
   responsive to confidence score above a threshold for one of the overlapping segments, re-segmenting each of the plurality of images such that the portion of the PDF is present in a single segment.

6. The method of claim 1, wherein generating the representation of text in the corresponding selected segments comprises:
   performing optical character recognition (OCR) on each corresponding selected segment; and
   generating a text vector based on the OCR of each corresponding selected segment.

7. The method of claim 6, wherein generating the text vector further comprises determining an average text vector for each sentence in each corresponding selected segment.

8. The method of claim 7, wherein determining similarity characteristics between the corresponding selected segments comprises performing a comparison between the average text vector for each sentence in each corresponding selected segment, the comparison based on a comparison metric.

9. The method of claim 8, wherein the comparison metric is at least one of: cosine similarity, dot product, Manhattan distance, Euclidean distance, Chebyshev distance, or any combination thereof.

10. The method of claim 8, wherein determining, based on the similarity characteristics whether the PDF document has been changed comprises determining an above threshold difference between the average text vector for each sentence in each corresponding selected segment.

11. The method of claim 1, further comprising generating a representation of images in the corresponding selected segments by performing pattern matching on each corresponding selected segment.

12. The method of claim 11, wherein the images in the corresponding selected segments include one or more signatures in the PDF document.

13. The method of claim 1, wherein surfacing one or more changes between the original copy and the modified copy of the PDF document to a user comprises notifying the document originator.

14. A non-transitory computer-readable storage medium storing executable instructions that, when executed by one or more processors, cause the one or more processors to:
receive an original copy of a PDF document;
receive a modified copy of the PDF document;
rasterize both the original copy and the modified copy of the PDF document into a plurality of images, each image of the plurality of images representing a page, wherein at least one image in the plurality of images includes at least one burned-in object; and
segment each of the plurality of images into a plurality of segments, segmenting of each of the plurality of images includes
determining a height and a buffer of a predetermined number of pixels for an image of each segment in the plurality of segments for expanding each segment;
expanding two or more adjacent segments using the height and the buffer of predetermined number of pixels of each of the two or more adjacent segments to generate at least two overlapping segments that overlap by the predetermined number of pixels;
determining at least one repeated portion in the original and modified copies of the PDF document in the at least two overlapping segments; and
selecting a segment in the at least two overlapping segments in the original and modified copies of the PDF document representative of the at least one repeated portion;
for corresponding selected segments derived from the original copy and the modified copy of the PDF document:
generate a representation of text in the corresponding selected segments;
determine similarity characteristics between the corresponding selected segments;
determine, based on the similarity characteristics, whether the PDF document has been changed; and
responsive to determining that the PDF document has been changed, generate a graphical user interface including a graphical notification surfacing one or more changes between the original copy and the modified copy of the PDF document to a user, the graphical user interface including an indication of one or more significant changes altering a meaning of the selected segment.

15. The non-transitory computer-readable storage medium of claim 14, wherein the one or more processors are configured to receive the original copy of the PDF document from a document originator.

16. The non-transitory computer-readable storage medium of claim 14, wherein the one or more processors are configured to receive the modified copy of the PDF document from a signer.

17. The non-transitory computer-readable storage medium of claim 14, wherein segmenting each of the plurality of images into the plurality of segments includes:
determining at least a portion of the PDF present in each overlapping segment;
responsive to determining that a threshold amount of the portion of the PDF is in one of the overlapping segments, re-segmenting each of the plurality of images such that the portion of the PDF is present in a single segment.

18. The non-transitory computer-readable storage medium of claim 14, wherein segmenting each of the plurality of images into the plurality of segments includes:
determining at least a portion of the PDF presenting in each overlapping segment;
determining a confidence score for each overlapping segment, the confidence score corresponding to an optical character recognition (OCR) operation on the portion of the PDF present in each overlapping segment; and
responsive to confidence score above a threshold for one of the overlapping segments, re-segmenting each of the plurality of images such that the portion of the PDF is present in a single segment.

19. The non-transitory computer-readable storage medium of claim 14, wherein the instructions that cause the one or more processors to generation of the representation of text in the corresponding selected segments includes:
performing optical character recognition (OCR) on each corresponding selected segment; and
generating a text vector based on the OCR of each corresponding selected segment.

20. A document management system comprising:
a hardware processor; and
a non-transitory computer-readable storage medium storing executable instructions that, when executed, cause the hardware processor to:
receive an original copy of a PDF document;
receive a modified copy of the PDF document;
rasterize both the original copy and the modified copy of the PDF document into a plurality of images, each image of the plurality of images representing a page, wherein at least one image in the plurality of images includes at least one burned-in object; and
segment each of the plurality of images into a plurality of segments, segmenting of each of the plurality of images includes
determining a height and a buffer of a predetermined number of pixels for an image of each segment in the plurality of segments for expanding each segment;
expanding two or more adjacent segments using the height and the buffer of predetermined number of pixels of each of the two or more adjacent segments to generate at least two overlapping segments that overlap by the predetermined number of pixels;

determining at least one repeated portion in the original and modified copies of the PDF document in the at least two overlapping segments; and selecting a segment in the at least two overlapping segments in the original and modified copies of the PDF document representative of the at least one repeated portion;

for corresponding selected segments derived from the original copy and the modified copy of the PDF document:

generate a representation of text in the corresponding selected segments;

determine similarity characteristics between the corresponding selected segments;

determine, based on the similarity characteristics, whether the PDF document has been changed; and responsive to determining that the PDF document has been changed, generate a graphical user interface including a graphical notification surfacing one or more changes between the original copy and the modified copy of the PDF document to a user, the graphical user interface including an indication of one or more significant changes altering a meaning of the selected segment.

\* \* \* \* \*